(12) United States Patent
Lundquist (10) Patent No.: US 7,514,006 B1
(45) Date of Patent: Apr. 7, 2009

(54) FIELD WATER PURIFICATION SYSTEM

(75) Inventor: Trygrve J Lundquist, San Luis Obispo, CA (US)

(73) Assignee: CalPoly Corporation, San Luis Obispo, CA (US)

( * ) Notice: Subject to any disclaimer, the term of this patent is extended or adjusted under 35 U.S.C. 154(b) by 0 days.

(21) Appl. No.: 12/111,130

(22) Filed: Apr. 28, 2008

(51) Int. Cl.
*B01D 35/14* (2006.01)

(52) U.S. Cl. .................... 210/723; 210/94; 210/533; 210/536; 210/407; 210/501; 210/749; 210/780

(58) Field of Classification Search ............... 210/94, 210/533, 536, 407, 501, 723, 749, 780
See application file for complete search history.

(56) References Cited

U.S. PATENT DOCUMENTS

| | | | |
|---|---|---|---|
| 4,031,006 A | 6/1977 | Ramirez | |
| 4,441,996 A * | 4/1984 | Hurst | 210/241 |
| 4,443,336 A | 4/1984 | Bennethum | |
| 4,776,963 A * | 10/1988 | Inagaki et al. | 210/764 |
| 4,957,209 A | 9/1990 | Helin | |
| 5,259,075 A * | 11/1993 | Cutler | 4/415 |
| 5,518,613 A | 5/1996 | Koczur | |
| 5,549,213 A * | 8/1996 | Robbins et al. | 220/8 |
| 5,681,475 A * | 10/1997 | Lamensdorf et al. | 210/666 |
| 5,733,448 A * | 3/1998 | Kaura | 210/238 |
| 5,792,370 A * | 8/1998 | Whipple | 210/749 |
| 6,245,228 B1 * | 6/2001 | Kelada | 210/206 |
| 6,334,543 B1 * | 1/2002 | Abbondandolo | 220/666 |
| 6,478,956 B2 * | 11/2002 | Kaura | 210/232 |
| 6,484,897 B1 * | 11/2002 | Crawley | 215/307 |
| 6,669,040 B2 * | 12/2003 | Higuchi | 215/381 |
| 7,007,725 B2 * | 3/2006 | Peltier | 141/316 |
| 7,014,782 B2 * | 3/2006 | D'Emidio et al. | 210/764 |
| 7,044,343 B2 * | 5/2006 | Anue | 224/148.5 |
| 7,063,804 B2 * | 6/2006 | Landis et al. | 252/176 |
| 7,153,438 B2 | 12/2006 | Souter | |
| 7,201,856 B2 | 4/2007 | Souter | |
| 7,250,619 B2 | 7/2007 | Taylor et al. | |
| 2003/0042201 A1 | 3/2003 | Sizelove et al. | |
| 2004/0067156 A1 * | 4/2004 | Eldred | 422/20 |
| 2004/0140267 A1 * | 7/2004 | Schiltz | 210/663 |
| 2006/0011715 A1 * | 1/2006 | Bartlett et al. | 229/124 |
| 2007/0248489 A1 | 10/2007 | Taylor et al. | |
| 2008/0267538 A1 * | 10/2008 | Stephenson | 383/33 |

OTHER PUBLICATIONS

John Bratby, Coagulation and Flocculation in Water and Wastewater Treatment, Published 2006, IWA Publishing Water 407 pages, ISBN:1843391066.
S.C. Kehoe et al., Letters in Applied Microbiology 38 (5), 410-414 doi:10.1111/j.1472-765X.2004.01515.x, 2004.
Mendez et al., (2005). Effect of Batch-Process Solar Disinfection on Survival of Cryptosporidium parvum Oocysts in Drinking Water. Appl Environ Microbiol. Mar. 2005; 71(3): 1653-1664.doi: 10.1128/AEM.71.3.1653-1654.2005.
Proter and Gamble, MSDS, "PuR Purifier of Water," Jill Karner, Apr. 17, 2007.

* cited by examiner

*Primary Examiner*—Chester T Barry
(74) *Attorney, Agent, or Firm*—Philip A. Steiner, Esq.

(57) ABSTRACT

A lightweight water treatment system which can be easily distributed and employed by disaster survivors for treating locally available water sources. The lightweight water treatment system includes a water treatment agent for treating a predetermined volume of water collected from a local water source; a collapsible elongated container for collecting the predetermined volume of water; one or more straps to transport the collapsible elongated container to a suitable location for treating the collected water with the water treatment agent and a spigot for controllably releasing the treated water.

21 Claims, 5 Drawing Sheets

FIELD WATER PURIFICATION SYSTEM

RELEVANT INVENTIVE FIELD

The present disclosure generally relates to water treatment and more specifically to potable water treatment employed in a field environment.

BACKGROUND

Potable water is essential for life. However, in many parts of the world potable water is not readily available particularly under natural disasters conditions such as fires, drought, flooding or earthquakes which may have caused normal sources of potable water to become contaminated. As such, disaster relief response requires that potable water be made available to the disaster survivors as soon as possible. This frequently requires that potable water be brought in from other unaffected areas which is slow, costly and difficult to distribute to the those in the most need of the potable water. In many cases, indigenous water may be available and could suffice if adequate treatment could be performed to remove pathogenic organisms and other contaminants such as organic matter, heavy metals and/or sediment. As with supplied potable water, skid mounted or package water treatment systems require that the equipment be brought to the disaster location and operated from a generally centralized location from which potable water is distributed.

While this response may be a viable solution over a protracted period of time, the disaster survivors located in remote areas may not be able to receive potable for several days, thus a need exists that provides a simple and effective way to provide potable water to disaster survivors before more elaborate water treatment systems are made available. In other situations, for example, military operations or certain types of outdoor recreational activities, the ability to treat locally available water without requiring heavy and/or space consuming equipment is likewise a recognized need in the relevant art.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

The various embodiments described herein address the limitations of the relevant art and provides a lightweight water treatment system which can be employed by the disaster survivors using locally available water sources. In accordance with one exemplary embodiment, a lightweight water treatment system for purifying water in a field environment is provided. In one exemplary embodiment, the lightweight water treatment system includes a water treatment agent for treating a predetermined volume of water collected from a local water source. The water treatment agent includes a flocculent aid for the removal of suspended solids, a biocide to disinfect the collected water from pathogenic organisms and/or an adsorbent, for example activated carbon for adsorbing hydrocarbons present in the collected water.

In various exemplary embodiments, the collected water is both collected and maintained in a collapsible elongated container. The collapsible elongated contained is provided with a fill line indicator disposed near one end of the collapsible elongated container which allows a user to obtain the predetermined volume of water and at the same time, a agitation air bubble of a proper volume is formed within a headspace to aid in mixing of the treatment agent and collected water required by the treatment process. In one exemplary embodiment, an effective amount of the water treatment agent is provided to treat the predetermined volume of water. The collapsible elongated container further includes an internal storage volume for maintaining the predetermined volume of water for treatment. The internal storage volume includes the headspace occupying at least 5% of the internal storage volume when the collapsible elongated container is filled with water to the fill line indicator. The headspace of air forms an agitation air bubble for mixing the water treatment agent in the predetermined volume of water maintained within the internal storage volume.

In one exemplary embodiment, a wide mouth port in communication with the internal storage volume is provided at the first end of the collapsible elongated container for receiving the predetermined volume of water. The wide mouth port in conjunction with the flexible elongated container and high length-to-width ratio allows quick filling in shallow water such as a stream bed.

A sealing member is then disposed between the fill line indicator and the first end of the collapsible elongated container for maintaining the volume of water within the internal storage volume for treatment. The sealing member may use a clamp, a pair of opposing and interlocking transverse ridges, tape, a twist-tie, tie-wrap, hook-and-loop fasteners, a rollable section of the collapsible elongated container, a draw string and/or any combination of these mechanisms.

A second end of the collapsible elongated container is used to receive sediment settling out of the predetermined volume of water. In one exemplary embodiment, the second end of the collapsible elongated container may include a sediment release valve for releasing sediment from the collapsible elongated container. In one exemplary embodiment, the second end of the collapsible elongated container may include a conical cross section in communication with the internal storage volume for collecting the sediment.

A spigot in communication with the internal storage volume is provided to allow the user to controllably release the water maintained within the internal storage volume of the collapsible elongated container. In one exemplary embodiment, the spigot is coupled to a tube for delivery of the treated water to a drinking container or directly to the mouth of a user.

In one exemplary embodiment, one or more straps are attached to the collapsible elongated container for transporting the collapsible elongated container. The straps may be configured to allow the user to transport the collapsible elongated container as a sling, a backpack or as a neck pack.

In one exemplary embodiment, the collapsible elongated container consists essentially of a collapsible elongated container having a thickness in a range of 6-30 mils, a storage volume in a range of 5-30 liters of water and a length-to-width ratio in a range of about 3:1-8:1.

In one exemplary embodiment, a filtration member for filtering the water released from at least the spigot is provided. The filtration member may utilize a filter cloth or a wire mesh having a pore size less than 0.5 millimeters to ensure certain pathogenic organisms which may be resistant to the biocide are removed from the treated water before consumption. The filtration member may contain an adsorbent, such as activated carbon particles or grains for removing organics, metals and oxidants and/or assist in sediment filtration.

In one exemplary embodiment, the collected water is treated using the water treatment agent. The water contained in the collapsible elongated container is then agitated by longitudinally rocking the collapsible elongated container back and forth a sufficient amount to effectively mix the water treatment agent with volume of water maintained within the internal storage volume and/or axially rolling the collapsible elongated container a sufficient amount to effectively mix the water treatment agent with the water maintained within the internal storage volume. The agitation air bubble assists in achieving the proper mixing conditions within the internal storage volume.

Once a sufficient amount of agitation has been provided, the collapsible elongated container is left undisturbed for a settling period to allow settable solids to settle from the water and allow the biocide sufficient time to disinfect the water. During the settling period, the collapsible elongated container may be oriented in a prone and an upright position to decrease the overall settling time required to achieve sufficient water clarity. In one exemplary embodiment, a clarity indicator for determining an effectiveness of the water treatment agent is provided. The clarity indicator allows the user to determine the effectiveness of the water treatment based on light transmission through the collapsible elongated container. In one exemplary embodiment, instructions for using the lightweight water treatment system may be printed on the collapsible elongated container in text and/or graphical formats. The collapsible elongated container may also be provided with external pouches for holding the treatment agents and/or other components needed to assemble the lightweight water treatment system.

BRIEF DESCRIPTION OF THE DRAWINGS

The features and advantages of lightweight water treatment system will become apparent from the following detailed description when considered in conjunction with the accompanying drawings. Where possible, the same reference numerals and characters are used to denote like features, elements, components or portions of various exemplary embodiments. It is intended that changes and modifications can be made to the described exemplary embodiments without departing from the true scope and spirit of the inventive embodiments as defined by the claims.

DETAILED DESCRIPTION

Various exemplary embodiments of a lightweight water treatment system are described. In the following description, for the purposes of explanation, numerous specific details are set forth in order to provide a thorough understanding of the various exemplary inventive features. It will be apparent, however, to a person having ordinary skill in the art that the various exemplary inventive features may be practiced without these specific details.

In one exemplary embodiment, a lightweight and collapsible water treatment system which can be easily distributed and employed by disaster survivors for treating locally available water sources. The lightweight treatment system may also be employed for military operations, emergency preparedness, and outdoor recreational activities such as camping and backpacking. The lightweight treatment system is a specially-designed elongated container to be used in the five essential steps of potable water provisioning including collection, transportation, treatment, storage, and dispensing. Each of these steps must be performed in an effective and hygienic manner in order for safe potable water to be made available. Some of the application areas mentioned above involve traumatized individuals under hazardous or disaster conditions where simplicity-of-use, minimization of physical exertion, and process robustness are particularly important. For purposes of this disclosure, flocs are settling masses formed in a fluid through precipitation or aggregation of suspended particles.

In accordance with one exemplary embodiment, the lightweight water treatment system for purifying water in a field environment is provided. In one exemplary embodiment, the lightweight water treatment system includes a water treatment agent for treating a predetermined volume of water collected from a local water source. The water treatment agent includes a coagulant and/or a flocculent to aid in the removal of suspended solids, a biocide to disinfect the collected water from pathogenic organisms and/or activated carbon for adsorbing hydrocarbons and other compounds present in the collected water.

Figure 1:
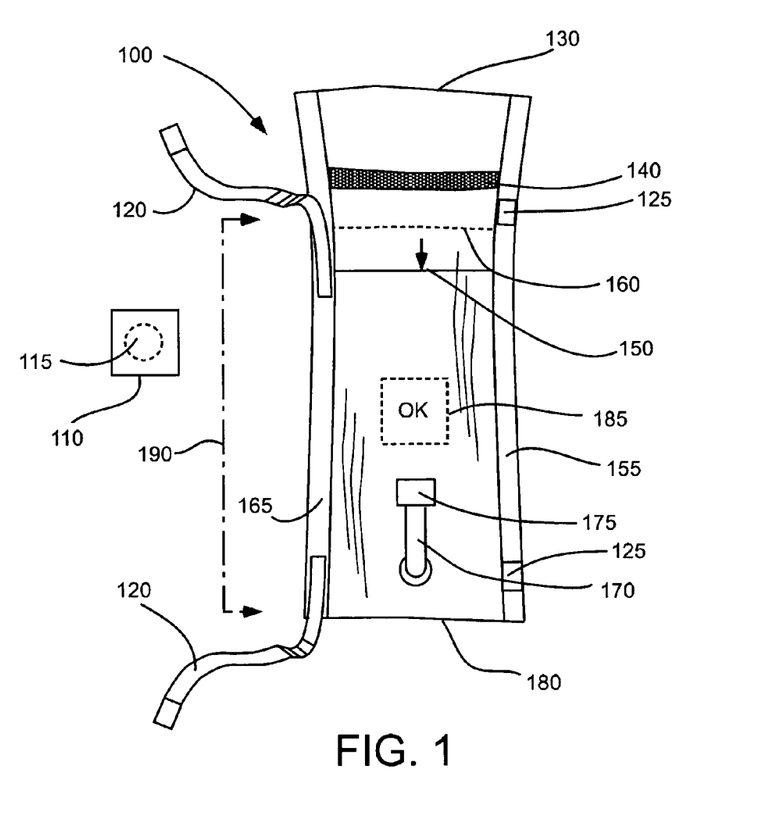
FIG. 1—depicts a front view of one exemplary embodiment of a lightweight water treatment system.

Referring to FIG. 1 a front view of one exemplary embodiment of an elongated container 100 is depicted. In one exemplary embodiment, the collapsible elongated container 100 is provided with a sachet 110 containing water treatment agent 115 for treating water collected using the collapsible elongated container 100. In one exemplary embodiment, the treatment agent comprises Pur™ sachets which are manufactured by Proctor and Gamble, Co. The formulations of the Pur™ sachets is described in U.S. Pat. Nos. 7,153,438, entitled "Water Treatment Compositions and Masking Agent," issued Dec. 26, 2006 and 7,201,856, entitled "Water Treatment Compositions," issued Apr. 10, 2007, both assigned to Pur Water Purification Products, Inc. The later and former patents are hereby incorporated by reference in their entirety as if fully set forth herein.

In one exemplary embodiment, the collapsible elongated container 100 is constructed from 2 or more sheets of polymeric material, each sheet having a thickness in a range of 6-30 mils or one folded sheet of polymeric material. The polymeric material from which the collapsible elongated container 100 is constructed should be flexible, strong, collapsible and resistant to puncture, abrasion, and wear. In one exemplary embodiment, the polymeric construction material is transparent or translucent to allow for observation of the treatment process and/or admittance of ultraviolet light to act as a biocide after the water treatment agent 115 have been mixed with the water to be treated.

Potentially suitable polymeric materials for use constructing the collapsible elongated container 100 include but are not limited to: low-density polyethylene, low-density linear polyethylene, high-density polyethylene, polypropylene, polyolephins, oriented polyethylene teraphthalates, polyvinyl floride, polyamides, polyarylsulfones, polyphthalamides, polysulfones, polyphenylsulfones, polyethersulfones, aliphatic polyketones, polyfluorocarbons, polybutadienes, polybutylene teraphthalates, polyesters, polyethylene teraphthalates, polyphenylene ethers, polyphenylene oxides, polyphenylene sulfides, polyphthalate carbonates, polypropylenes, polystyrenes, polyurethanes, polyvinyl chlorides. Thermoplastics are typically used due to their recycling ability. However, a person having ordinary skill in the art will appreciate that various polymeric construction materials may be used to achieve a specific requirement.

The two or more polymeric sheets used for construction of the collapsible elongated container 100 are arranged to form a predetermined internal storage volume 190 dimensioned to coincide with the quantity of treatment agent 115 typically provided in a sachet 110. Standardized internal storage volumes are formed when the two or more polymeric sheets are thermally fused together using high length-to-width ratios in a range of about 3:1-8:1 depending on the volume of water to be retained in the internal storage volume 190 of the collapsible elongated container 100 and/or the manner in which the collapsible elongated container 100 is intended to be transported as is provided with the discussion accompanying FIGS. 4A-4C below.

The internal storage volume 190 of the collapsible elongated container 100 are typically constructed in volumes of 5, 10, 20 or 30 liters. Larger volumes may be constructed as well, however, larger volumes become increasing more difficult to handle and transport due to water weight and the flexibility of the collapsible elongated container 100.

The two or more polymeric sheets are sealed on opposing longitudinal sides 155, 165 and laterally at one end 180 (FIG. 1B) to form a collapsible elongated container 100. The sealed end 180 (FIG. 1B) of the collapsible elongated container 100 is used to collect sediments settling out of the water being treated within the internal storage volume 135.

Excess polymeric sheeting materials adjacent to seams surrounding the collapsible elongated container 100 formed by the thermal fusion process are used for attaching one or more straps 120 to the collapsible elongated container 100 for transporting the lightweight water treatment system as is provided with the discussion accompanying FIGS. 4A-4D below. The remaining excess polymeric sheeting material is simply cut away from the completed elongated container 100.

Figures 1A, 1B:
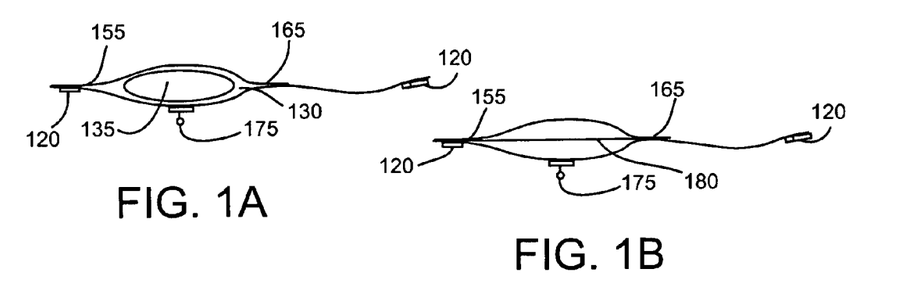
FIG. 1A—depicts a top view of one exemplary embodiment of a lightweight water treatment system.
FIG. 1B—depicts a bottom view of one exemplary embodiment of a lightweight water treatment system.

The lateral end 130 opposite the sealed end 180 of the collapsible elongated container 100 is used as a wide mouth port 135 (FIG. 1A) to admit water to be treated into the internal storage volume 135. The wide mouth port 135 in conjunction with the flexible polymeric material and the shape of the collapsible elongated container 100 facilitates water collection from shallow water bodies such as streams and/or puddles. The wide mouth port 135 also allows the user to remove undesirable floating matter that may be inadvertently collected with the water.

A fill line indicator 150 is provided on the collapsible elongated container 100 to provide a visual indication to a user of the quantity of water to be collected. The internal storage volume 190 includes sufficient head space 160 to allow for the formation of an agitation air bubble of a specific size of about 50%-75% of a cross-sectional diameter of the collapsible elongated container 100. The agitation air bubble is used for mixing the water treatment agent 115 with the water contained in the internal storage volume 190 as is provided with the discussion accompanying FIG. 5 below.

The collapsible elongated container 100 is provided with a sealing member 140 to close the wide mouth port 130 of the collapsible elongated container 100. In one exemplary embodiment, the sealing member 140 is constructed from hook-and-loop fasteners (e.g., Velcro™) as is provided with the discussion accompanying FIGS. 3 and 3A below. In various embodiments, the sealing member 140 may be a draw string, a separately provided clamp, a pair of opposing and interlocking transverse ridges (e.g., Ziploc™), tape (e.g., duct tape), a twist-tie, a tie-wrap or any other simple sealing device.

In one exemplary embodiment, a spigot 175 is mounted on a stem 170 is provided for releasing treated water from the internal storage volume 135. In another exemplary embodiment, the spigot 175 may be attached directly to the collapsible elongated container 100.

The collapsible elongated container 100 may be oriented so as to allow gravity feed of water through the spigot 175. The spigot 175 should be located about 6" above the bottom end 180 of the collapsible elongated container 100, 200. Alternately, a user may squeeze the collapsible elongated container 100 to force water from the internal storage volume 190 and out through the spigot 175 or suck water from the collapsible elongated container 100 using the spigot 175. In one exemplary embodiment, the spigot 175 requires an upward or downward pulling action to allow water to be released from the internal storage volume 135. The stem 170 is attached through the wall of the collapsible elongated container 100 typically by a thermal fusion process or an adhesive and/or vulcanization process. A person having ordinary skill in the art will appreciate that any suitable valve mechanism will work with the collapsible elongated container 100.

In one exemplary embodiment, a clarity indicator 185 is provided which allows a user to visually determine the effectiveness of the treatment agent based on the ability to observe a graphic and/or text through the collapsible elongated container 100. The clarity indicator 185 may be a simple adhesive label applied to the collapsible elongated container 100 after construction. In one exemplary embodiment, attachment points 125 are provided on the sides of the collapsible elongated container 100 for the attachment of at least one strap 120.

In one exemplary embodiment, a mechanism is provided to isolate collected sediment from the treated water. The particular mechanism may utilize any of the mechanisms discussed above for the sealing member 140.

Figure 2:
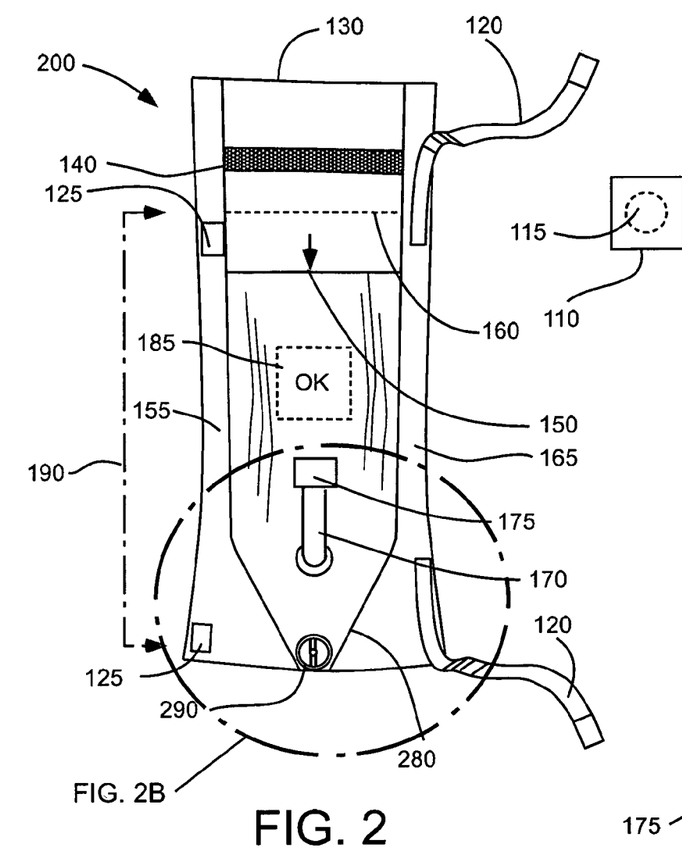
FIG. 2—depicts a front view of one exemplary embodiment of a lightweight water treatment system.

Referring to FIG. 2, a second exemplary embodiment of the collapsible elongated container 200 is depicted. In this exemplary embodiment, the lower end 280 of the internal storage volume 190 is narrowed (FIG. 2B), for example, by providing a conical shape to facilitate the capture, sequestering and/or removal of sediment from the internal storage volume 190. A drain plug or valve 290 is provided to allow the captured sediment to be removed from the bottom end of the collapsible elongated container 200. The narrowing of the lower end 280 of the internal storage volume 190 facilitates the use of a clamp on the exterior of the collapsible elongated container 200 to isolate the collected sediment from the treated water contained in the internal storage volume 190. The removal of the captured sediment may be advantageous in certain situations to improve disinfection of the water remaining in the internal storage volume 190. All other aspects of this embodiment are similar to those provided in the discussion accompanying FIGS. 1, 1A, 1B and not repeated here for simplicity and brevity.

Figure 2A:
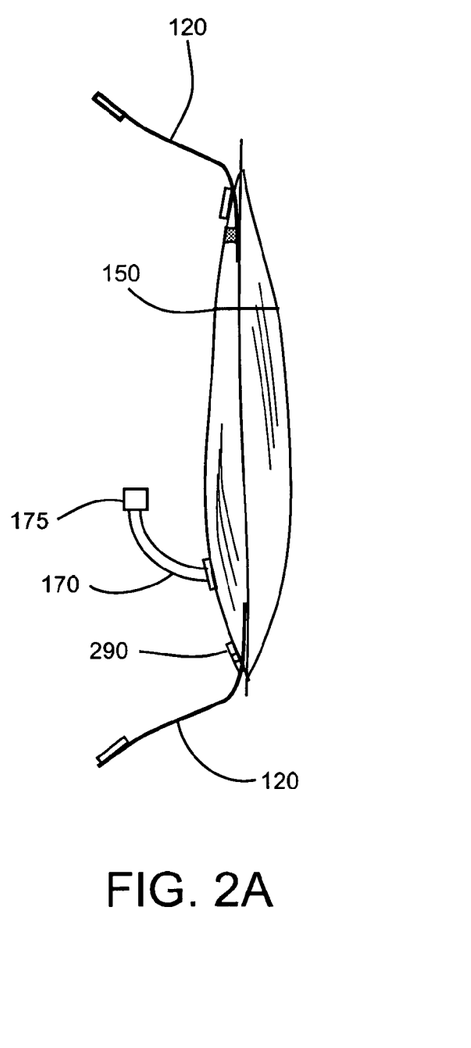
FIG. 2A—depicts a side view of one exemplary embodiment of a lightweight water treatment system.

Referring to FIG. 2A a side view of the second exemplary embodiment of the collapsible elongated container 200 is depicted. In this exemplary embodiment, the generally high length-to-width ratio of the collapsible elongated container 200 is visible. As previously discussed, the dimensions of the collapsible elongated container 200 is dependent on the desired internal storage volume 135 (FIG. 2) and/or the manner in which the collapsible elongated container 100, 200 is intended to be transported.

Figure 2B:
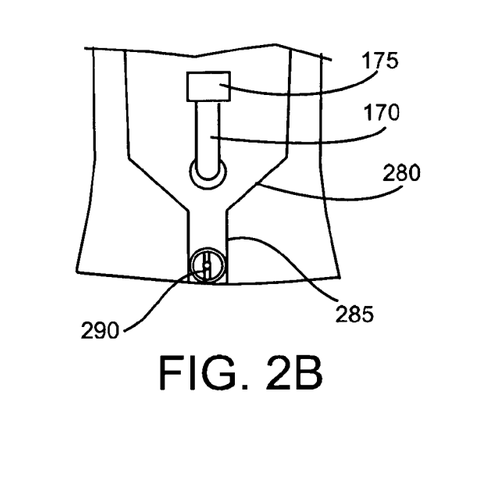
FIG. 2B—depicts another front view of one exemplary embodiment of a lightweight water treatment system.

Referring to FIG. 2B, another exemplary embodiment of a lightweight water treatment system is depicted where the second end 280 of the collapsible elongated container 200 is narrowed and/or includes a conical section for capturing sediment and settling flocs. As discussed above, the sediment and collected flocs may be isolated and/or removed from the internal storage volume 190 to prevent reintroduction of pathogens into the treated water.

Figure 3:
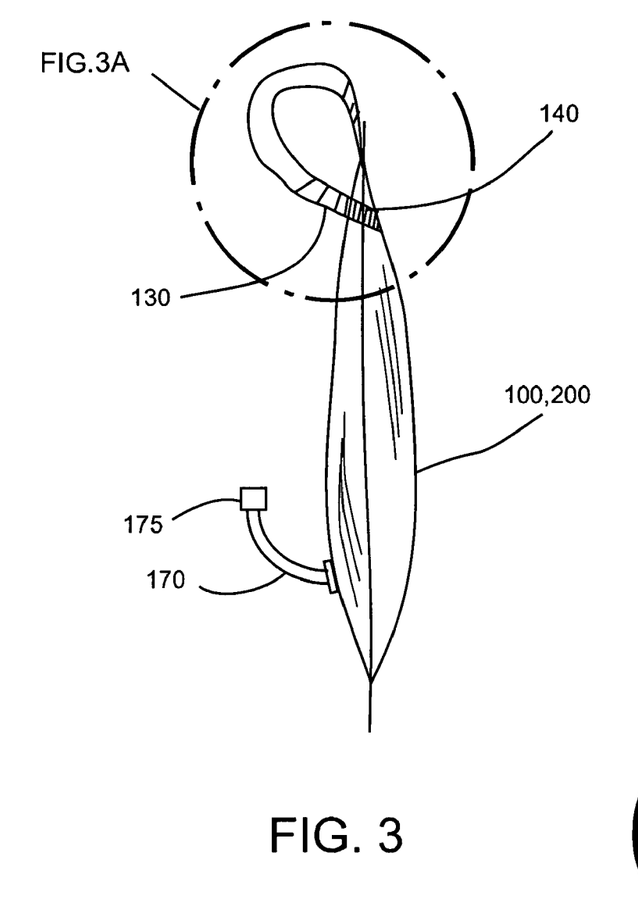
FIG. 3—depicts a side view of one exemplary embodiment of a sealing member.
Figure 3A:
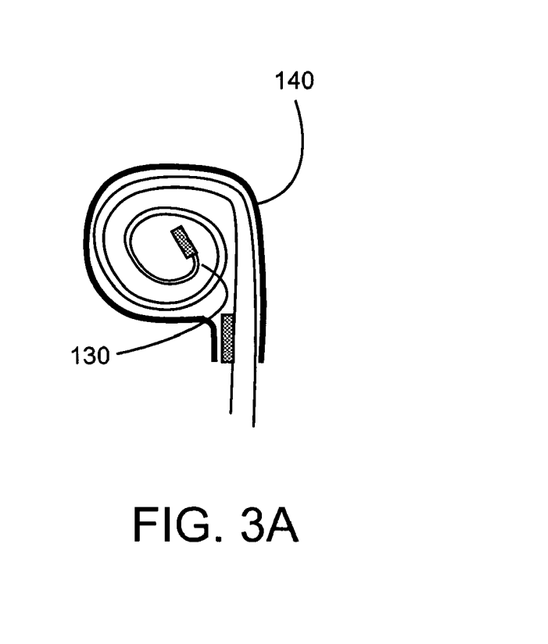
FIG. 3A—depicts a detailed side view of one exemplary embodiment of a sealing member.

Referring to FIG. 3, one exemplary embodiment of a sealing member 140 is depicted in which an upper portion of the collapsible elongated container 100, 200 above the fill line indicator 150 is rolled up and held in place by hook-and-loop fasteners 140 as is depicted in FIG. 3A. In this embodiment, one or more strips of hook-and-loop fasteners 140 extend longitudinally over the end 130 of the collapsible elongated container 100, 200 and securely maintain the rolled portion of the collapsible elongated container in place to prevent collected water from being accidentally released through the wide mouth port 135 (FIG. 1A). In one exemplary embodiment, an additional or substitute sealing member 140 may be formed at the first end of the collapsible elongated container 100, 200 using any of the previously discussed sealing members 140.

Figure 4A:
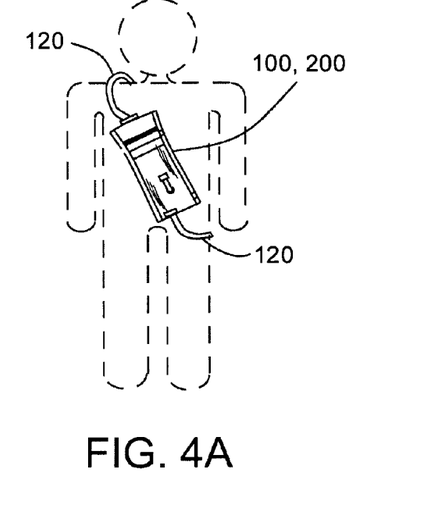
FIG. 4A—depicts one exemplary embodiment of a lightweight water treatment system arranged as a sling.
Figure 4B:
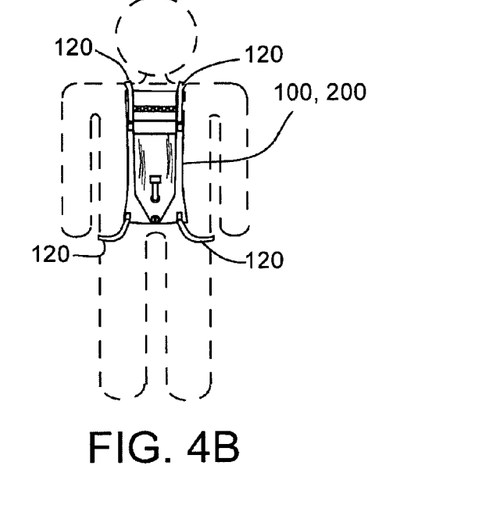
FIG. 4B—depicts one exemplary embodiment of a lightweight water treatment system arranged as a backpack.
Figure 4C:
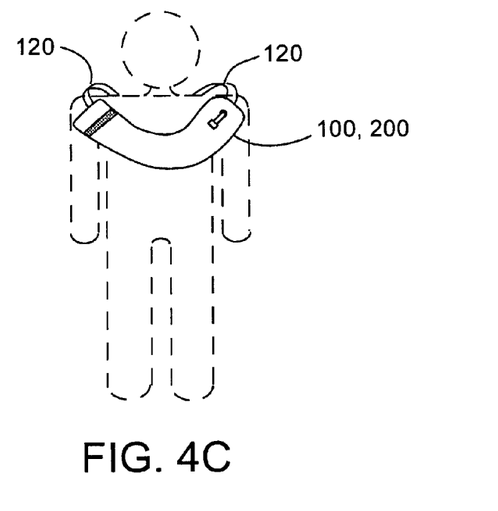
FIG. 4C—depicts one exemplary embodiment of a lightweight water treatment system arranged as a neck pack.

Referring to FIGS. 4A-C, a plurality of exemplary transport arrangements are possible by changing the positions and/or adding straps 120 to the collapsible elongated container 100, 200. For example, in FIG. 4A, the collapsible elongated container 100, 200 is configured as a sling in which a person is able to transport collected water by draping a strap diagonally across a trunk of the body. In the sling configuration, a length-to-width ratio of 3:1 to 8:1 (when sealed) is generally used for internal storage volumes 190 (FIGS. 1 and 2) ranging between 10 and 20 liters of water. In one exemplary embodiment, the collapsible elongated container 100, 200 is approximately 36" in length with a diameter of approximately 5" for containing about 10 liters. In one exemplary embodiment, the collapsible elongated container 100, 200 is approximately 36" in length with a diameter of approximately 7" for containing about 20 liters of water. When configured with the length-to-width ratio of 3:1 to 8:1, the collapsible elongated container 100, 200 essentially forms a flexible cylinder which conforms to the person's shape during transport.

In FIG. 4B, the collapsible elongated container 100, 200 is configured as a backpack. In this exemplary embodiment, the length-to-width ratio ranges from about 3:1-4:1. In this embodiment, the length of the internal storage volume 190 (FIGS. 1 and 2) is about 22" with a diameter of approximately 6" for 10 liters of water. For 20 liters of water the diameter is increased to approximately 8.5".

In FIG. 4C, the collapsible elongated container 100, 200 is configured as a neck pack. In this exemplary embodiment, the length-to-width ratio and dimensions approximates those of the sling configuration shown in FIG. 4A. However, the dimensions of any of the transport configurations may be adjusted to better serve populations of various statures.

Figure 4D:
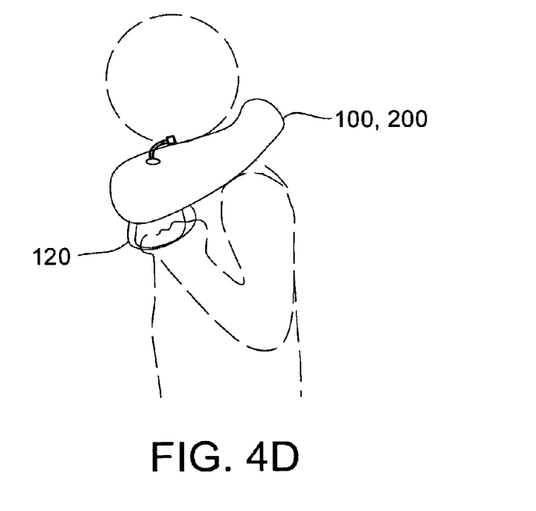
FIG. 4D—depicts one exemplary embodiment of a lightweight water treatment system arranged as a neck pack.

In FIG. 4D, the collapsible elongated container 100, 200 is configured as a neck pack. In this exemplary embodiment, the straps 120 are configured as hand straps or grips for transporting the collapsible elongated container 100, 200 around the neck of the user. In any of the foregoing exemplary embodiments described in FIGS. 4A-4D, the straps 120 may be constructed of any suitable material such as from the polymeric sheet used to form the collapsible elongated container 100, 200, rope, nylon, canvas, etc. A person having ordinary skill in the art will appreciate that a vast number of options exist for the construction of the straps 120 used to attach to the collapsible elongated container 100, 200.

Figure 5:
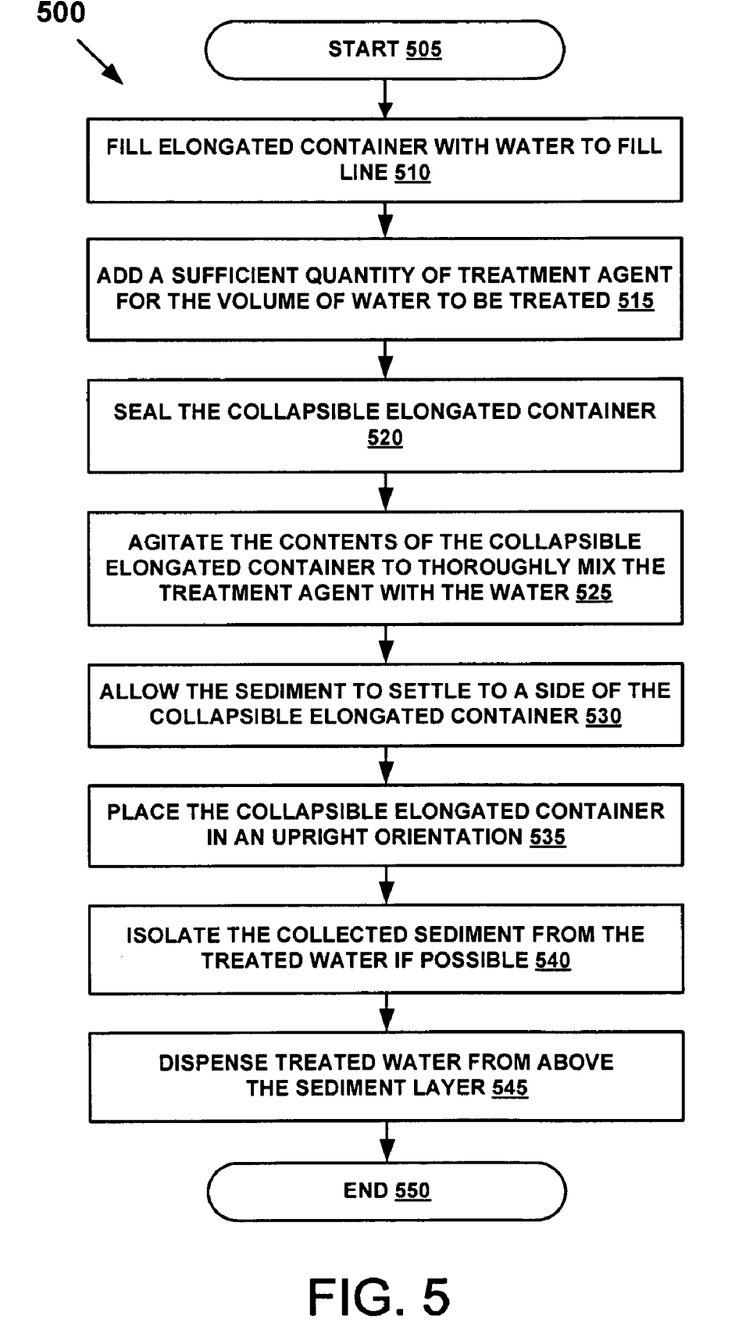
FIG. 5—depicts a process for treating water using an one exemplary embodiment of the water treatment system.

Referring to FIG. 5, a process for treating water using either exemplary embodiment of the lightweight water treatment system is depicted. The process 500 is initiated by a user filling an elongated container 100, 200 to the fill line indicator 150. The wide mouth port 135 may be stretched open by hand and submerged into a water source, such as a stream, in order to fill the collapsible elongated container 100, 200 to the fill-line marking 150. The water level in the collapsible elongated container 100, 200 should be at or below the fill line indicator 150 when the collapsible elongated container is held upright 100, 200 in order for a agitation air bubble of a specific size to form within the headspace 160.

The collection of twigs, leaves, large particles and other debris should be minimized where possible. In one exemplary embodiment, a mesh or cloth filter is provided to inhibit the collection of the solid matter. Floating matter such as oils and scum should likewise be avoided by collecting from below the water surface. If floating matter is inadvertently collected, the user may squeeze the collapsible elongated container sufficiently to discharge the floating matter out through the wide mouth port 135.

The wide mouth port 135 at the end of the collapsible elongated container 130 is then sealed using the seal member 140 as previously described above. The collapsible elongated container 100, 200 is then carried and/or transported to a safe location for performing the water treatment.

To treat the collected water, the wide mouth port 135 at the end of the collapsible elongated container 130 is opened and the provided treatment agent are added 515. The treatment agent may be in the form of a single powder, liquid, or tablet as is provided in the Pur product discussed above. The Pur™ product is intended to treat volumes of water in 10 liter amounts. Therefore, greater volumes will require additional sachets of Pur™. Alternately, separate disinfectants and coagulants may be added in lieu of the Pur™ product in amounts specified by the manufacturer of the specific water treatment agent.

In one exemplary embodiment, powdered activated carbon may be included with the water treatment agent to remove organic contaminants such as gasoline, or pesticides, metals and excess oxidants. Once the water treatment agent have been added to the water to be treated, the wide mouth port 135 at the end of the collapsible elongated container 130 is then resealed using the seal member 140 as previously described above 520.

The contents of the collapsible elongated container 100, 200 are then agitated to thoroughly mix the treatment agent with the collected water 525. Agitation may be accomplished by the user grasping the first and second ends 130, 180 of the collapsible elongated container 100, 200 and repeatedly inverting the collapsible elongated container 100, 200 to cause agitation air bubble(s) to rapidly move from one end of the collapsible elongated container 100, 200 to the other. This vigorous agitation should be continued for approximately 30 seconds. The generated agitation air bubble(s) provide displacement mixing by forcing water around the agitation air bubble during its movement. The optimal rate of inverting is 30-60 cycles per 30 seconds of rapid mixing.

Effective rapid mixing (agitation) is required to ensure proper water treatment is accomplished using many water treatment agents. The combination of the collapsible elongated container 100, 200 and fill line indicator 150 provides a sufficient agitation air bubble volume-to-water volume ratio (greater than 5%) to ensure the effective rapid mixing. The configuration of the collapsible elongated container 100, 200 allows the user to achieve effective agitation by inverting the collapsible elongated container without the physical exertion required to rapidly shake a more cubical container to achieve the required mixing intensity.

To achieve flocculation, gentle mixing is employed for about 3 to 10 minutes following the vigorous agitation. The collapsible elongated container 100, 200 may be axially rolled on the ground at rate of approximately 40 to 60 rotations per minute. Alternatively, the collapsible elongated container 100, 200 may be gently rocked from end-to-end by alternately lifting and lowering approximately one fourth of the length of the collapsible elongated container 100, 200 at rate of approximately 15 to 25 oscillations per minute. Alternately, transporting the collapsible elongated container 100, 200 on foot for 10-20 minutes also provides sufficient gentle agitation. Longer agitation/gentle mixing times may be required when water temperatures are below approximately 15° C.

The collapsible elongated container 100, 200 is then placed in a horizontal orientation to allow sediment to settle 530 to the bottom of the collapsible elongated container 100, 200 for at least 15 minutes, or until no flocs are visible in the treated water. An indicator of successful flocculation and sedimentation is the improved clarity of the treated water, which should be apparent through the translucent polymeric construction of the collapsible elongated container 100, 200. After the horizontal settling, the collapsible elongated container 100, 200 is carefully placed in an upright orientation 535 by slowly lifting one end of the collapsible elongated container until the sediment moves to the collection end 180, 280 of the collapsible elongated container 100, 200. Vertical settling should be assumed to be completed when no flocs are visible in the water column. Tapping of the walls of the collapsible elongated container 100, 200 may be required to dislodge any clinging flocs. The collapsible elongated container 100, 200 may be hung by one or more of the straps 120 during the vertical settling.

If possible, the collected sediment should be isolated from the clarified water 540 as the accumulated sediment may still contain live pathogenic organisms and thus should not be allowed to contaminate the treated water 540. The sediment isolation may be accomplished by placing a clamp across the collapsible elongated container 100, 200 at about six inches above the sediment layer or alternately by using the drain plug 290 available in the second embodiment of the collapsible elongated container 200.

The treated water may be dispensed from the clarified end of the collapsible elongated container 100, 200 after the sediment is removed or isolated and after disinfection has been completed 545. The spigot 175 may be an integrated valve or closeable stem 170 in one wall of the collapsible elongated container 100, 200. The closure of the spigot 175 should be nearly flush with the wall of the collapsible elongated container 100, 200 in order to minimize the risk of trapping flocs potentially containing pathogens in the stem 170. Any such trapped flocs are intended to be removed during filtration. This completes the water treatment process 550.

In the foregoing specification, the various exemplary inventive features have been described with reference to specific embodiments herein. It will, however, be appreciated by a person having ordinary skill in the art that various modifications and changes may be made thereto without departing from the broader spirit and scope of the various inventive embodiments disclosed. The specification and drawings are, accordingly, to be regarded in an exemplary rather than a restrictive sense.

What is claimed:

1. A lightweight water treatment system for purifying water in a field environment comprising:
    a water treatment agent for treating a predetermined volume of water maintained within a collapsible elongated container;
    the collapsible elongated container including;
    a fill line indicator disposed near a first end of the collapsible elongated container for defining the predetermined volume of water;
    an internal storage volume for maintaining the predetermined volume of water; the internal storage volume including a headspace of air occupying at least 5% of the internal storage volume when the collapsible elongated container is filled with water to the fill line indicator;
    a wide mouth port in communication with the internal storage volume provided at the first end of the collapsible elongated container for receiving the predetermined volume of water to be maintained within the internal storage volume of the collapsible elongated container;
    a sealing member disposed between the fill line indicator and the first end of the collapsible elongated container for maintaining the volume of water within the internal storage volume;
    a second end of the collapsible elongated container for receiving sediment settling out of the predetermined volume of water maintained within the internal storage volume;
    a spigot in communication with the internal storage volume for controllably releasing at least a portion of the water maintained within the internal storage volume of the collapsible elongated container; and,
    at least one strap coupled to the collapsible elongated container for transporting the collapsible elongated container.

2. The lightweight water treatment system according to claim 1 wherein the collapsible elongated container consists essentially of a flexible plastic container having a thickness in a range of 6-30 mils, a storage volume in a range of 5-30 liters of water and a length-to-width ratio in a range of about 3:1-8:1.

3. The lightweight water treatment system according to claim 1 wherein the sealing member is selected from the group consisting essentially of a clamp, a pair of opposing and interlocking transverse ridges, tape, a twist-tie, a tie-wrap, hook-and-loop fasteners, a rollable section of the collapsible elongated container, a draw string and any combination thereof.

4. The lightweight water treatment system according to claim 1 wherein the at least one strap is configured for allowing a user to transport the collapsible elongated container as one of a sling, a backpack and a neck pack.

5. The lightweight water treatment system according to claim 1 further including a filtration member for filtering the water released from the spigot, the filtration member comprising a filter cloth or a wire mesh having a pore size less than 0.5 millimeters.

6. The lightweight water treatment system according to claim 1 wherein the second end of the collapsible elongated container includes a sediment release valve for releasing sediment from the collapsible elongated container.

7. The lightweight water treatment system according to claim 6 wherein the water treatment agent further comprises activated carbon for adsorbing hydrocarbons present in the predetermined volume of water maintained within the internal storage volume.

8. The lightweight water treatment system according to claim 1 wherein the headspace of air forms an agitation air bubble for mixing the water treatment agent in the predetermined volume of water maintained within the internal storage volume.

9. The lightweight water treatment system according to claim 8 wherein the mixing is performed by one of;
longitudinally rocking the collapsible elongated container back and forth a sufficient amount to effectively mix the water treatment agent with volume of water maintained within the internal storage volume;
alternately inverting the first and second ends of the collapsible elongated container to effectively mix the water treatment agent with volume of water maintained within the internal storage volume;
axially rolling the collapsible elongated container a sufficient amount to build flocs within the volume of water maintained within the internal storage volume; and,
any combination thereof.

10. The lightweight water treatment system according to claim 1 wherein the second end of the collapsible elongated container includes a narrowed or conical cross section in communication with the internal storage volume for collecting the sediment.

11. The lightweight water treatment system according to claim 1 further including a clarity indicator for determining an effectiveness of the water treatment agent.

12. A lightweight water treatment system for purifying water in a field environment comprising:
an effective amount of water treatment agent for treating a predetermined volume of water maintained within an internal storage volume of an collapsible elongated container;
the collapsible elongated container including;
a fill line indicator disposed near a first end of the collapsible elongated container for defining the predetermined volume of water;
an internal storage volume for maintaining the predetermined volume of water; the internal storage volume including a headspace of air occupying approximating 10-15% of the internal storage volume when the collapsible elongated container is filled with water to the fill line indicator and oriented in an upright position;
a wide mouth port in communication with the internal storage volume provided at the first end of the collapsible elongated container for receiving the predetermined volume of water to be maintained within the internal storage volume of the collapsible elongated container;
a sealing member disposed between the fill line indicator and the first end of the collapsible elongated container for maintaining the volume of water within the internal storage volume;
a second end of the collapsible elongated container configured to receive sediment settling out of the volume of water maintained within the internal storage volume;
a spigot in communication with the internal storage volume for controllably releasing at least a portion of the water from the collapsible elongated container; and,
at least one strap longitudinally coupled to the collapsible elongated container for transporting the collapsible elongated container.

13. The lightweight water treatment system according to claim 12 wherein the sealing member is selected from the group consisting of a clamp, interlocking transverse ridges, tape, a twist-tie, tie-wrap, hook-and-loop fasteners, a rollable section of the collapsible elongated container above the fill line indicator and any combination thereof.

14. The lightweight water treatment system according to claim 12 wherein the at least one strap is configured for allowing a user to transport the collapsible elongated container as a sling, a backpack or a neck pack.

15. The lightweight water treatment system according to claim 12 further including a filtration member for filtering the water released from the spigot.

16. The lightweight water treatment system according to claim 15 wherein the filtration member is a filter cloth or wire mesh having a porosity of less than 0.5 millimeters.

17. The lightweight water treatment system according to claim 12 wherein the water treatment agent includes;
a flocculent for removing suspended matter from the predetermined volume of water maintained within the internal storage volume; and,
a biocide for disinfecting the predetermined volume of water maintained within the internal storage volume.

18. The lightweight water treatment system according to claim 12 wherein a length-to-width ratio of the collapsible elongated container is in a range of about 3:1-8:1.

19. The lightweight water treatment system according to claim 12 wherein the second end of the collapsible elongated container includes a narrowed or conical cross section in communication with the internal storage volume for collecting the sediment.

20. A method for purifying water in a field environment using the lightweight water treatment system according to claim 1 comprising:
filling the collapsible elongated container with water to the fill line indicator;
adding an effective amount of the water treatment agent for the predetermined volume of water to be treated;
sealing the collapsible elongated container with the sealing member;
agitating the predetermined volume of water maintained within the internal storage volume for thoroughly mixing the water treatment agent with the predetermined volume of water and for promoting formation of rapidly settling flocs;
allowing a sufficient amount of time for the rapidly settling flocs to settle to a side of the collapsible elongated container and for disinfection of pathogens;
placing the collapsible elongated container in an upright orientation for collecting sediment in the second end of the collapsible elongated container; and,
dispensing the treated water from the collapsible elongated container with the spigot.

21. The method of purifying water in a field environment according to claim 20 wherein the agitating includes one of;
longitudinally rocking the collapsible elongated container back and forth a sufficient amount to effectively mix the water treatment agent with the predetermined volume of water maintained within the internal storage volume;
alternately inverting the first and second ends of the collapsible elongated container to effectively mix the water treatment agent with volume of water maintained within the internal storage volume;
axially rolling the collapsible elongated container a sufficient amount to effectively mix the water treatment agent with predetermined volume of water maintained within the internal storage volume; and,
any combination thereof.

* * * * *